United States Patent [19]

Papania

[11] Patent Number: 5,598,909
[45] Date of Patent: Feb. 4, 1997

[54] ROLLER CLUTCH HAVING INDIVIDUAL SNAPPING SEGMENTS

[75] Inventor: James R. Papania, Bolingbrook, Ill.

[73] Assignee: Borg-Warner Automotive, Inc., Sterling Heights, Mich.

[21] Appl. No.: 398,018

[22] Filed: Mar. 3, 1995

[51] Int. Cl.⁶ .................................................. F16D 3/34
[52] U.S. Cl. ..................... 192/45; 192/41 R; 188/82.84
[58] Field of Search ........................... 192/45, 44, 41 R; 188/82.1, 82.84

[56] References Cited

U.S. PATENT DOCUMENTS

| | | | |
|---|---|---|---|
| 4,054,192 | 10/1977 | Johnson | 192/45 |
| 4,106,602 | 8/1978 | Dieckermann | 192/45 |
| 4,185,724 | 1/1980 | Kitchin | 192/45 |
| 4,239,304 | 12/1980 | Wakunami | 308/217 |
| 4,397,507 | 8/1983 | Kraus et al. | 308/217 |
| 4,679,676 | 7/1987 | King | 192/45 |
| 4,712,661 | 12/1987 | Lederman et al. | 192/45 |
| 4,724,940 | 2/1988 | Lederman | 192/45 |
| 4,821,856 | 4/1989 | Lederman | 192/45 |
| 4,830,157 | 5/1989 | Lederman | 192/45 |
| 4,834,227 | 5/1989 | Lederman | 192/45 |
| 4,850,463 | 7/1989 | Lederman | 192/45 |
| 4,901,834 | 2/1990 | Lederman | 192/45 |
| 4,987,670 | 1/1991 | Papania | 29/451 |
| 4,995,489 | 2/1991 | Lederman et al. | 192/45 |
| 5,273,144 | 12/1993 | Papania | 192/45 |

FOREIGN PATENT DOCUMENTS 2604567  8/1977  Germany.

OTHER PUBLICATIONS

International Search Report in EP 95 30 7905 corresponding to USSN 08/398,018.

Primary Examiner—Andrea L. Pitts
Attorney, Agent, or Firm—Emch, Schaffer, Schaub et al.; Greg Dziegielewski

[57] ABSTRACT

A cage segment for use in a clutch having a cam race and a pathway race. The cage segment has at least one engaging means which matingly engages a retaining means on the cam race. The cage segment is secured to the cam race in the radial, axial and circumferential directions.

15 Claims, 2 Drawing Sheets

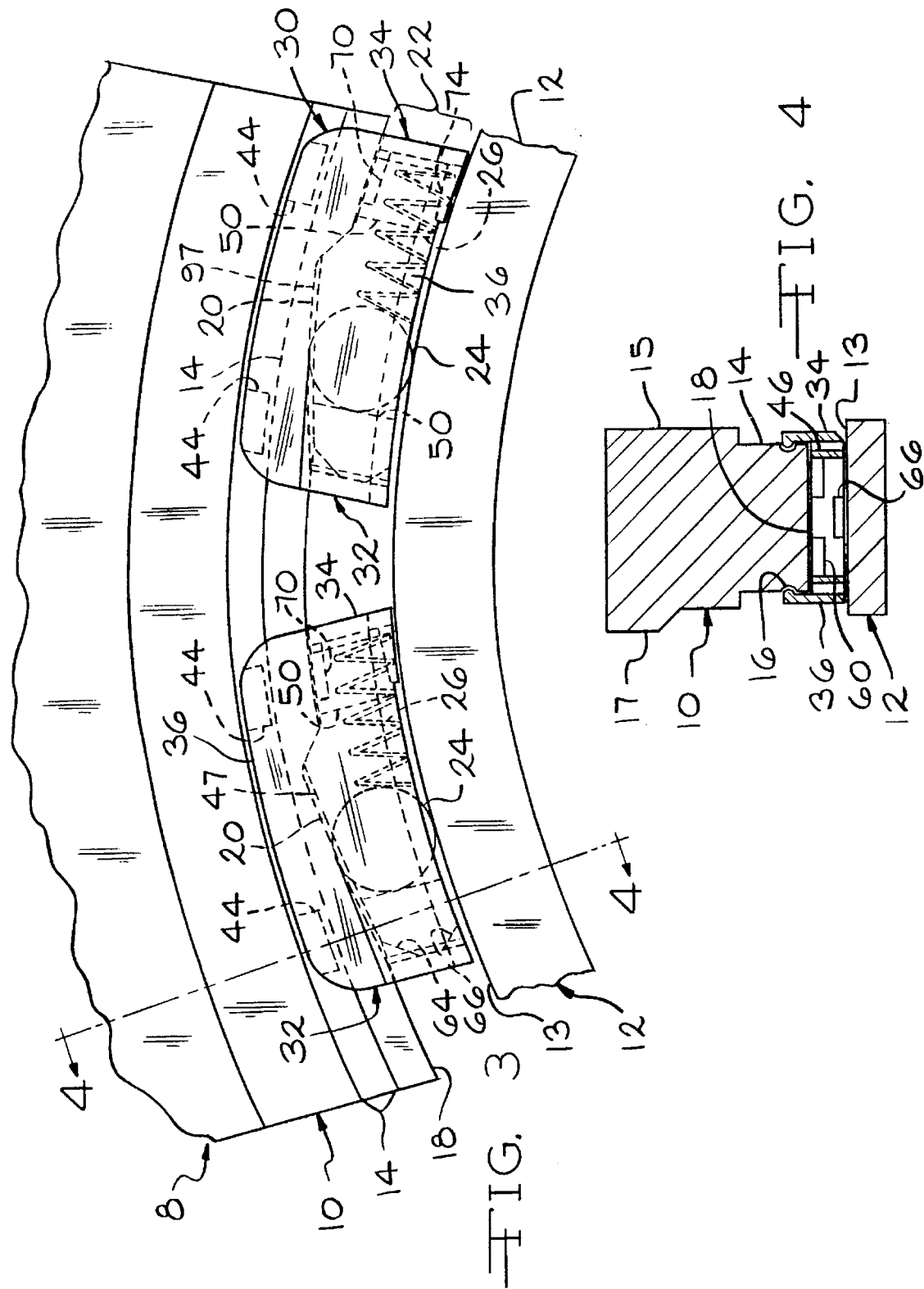

ROLLER CLUTCH HAVING INDIVIDUAL SNAPPING SEGMENTS

TECHNICAL FIELD

This invention relates to roller clutches in general and specifically to individual snapping segments for use in roller clutches which are desired to provide secure roller retention in the radial, axial and circumferential directions. The individual segments also provide a roller clutch with a simplified assembly and installation.

BACKGROUND ART

Many automotive transmissions use overrunning roller clutches to provide selective relative rotation between a pair of races. Different types of clutch cages have been utilized in such transmissions. One-piece clutch cages are integrally molded and adapted to be installed in an annular space between the races. Other clutch cages are segments which are linked together and installed in the annular space between the races. With both types of clutch cages it is important to insure that the races are maintained in a coaxial relation. While bearing portions of each clutch cage are to maintain the races in this coaxial position there is sometimes a shift or skewing which occurs and moves one or the other race out of coaxial alignment.

In order to overcome this problem of non-coaxial alignment, one-piece cages are used. The one-piece cages require at least one expansion joint to diverge with temperature changes, moisture absorption and cooling rates during use of the automatic transmission. In the installation of the one-piece cages, a simultaneous torque and thrust load is required in order to assemble the cylindrical race. This presents ergonomic problems since one-piece cages are not perfectly round and therefore require higher torque during assembly.

Further, one-piece cages which have incorporated therein expansion joints must elastically deform during the heat cycles of the automatic transmission. However, the cage expansion joints have a tendency to plastically deform which causes interference fits and increased frictional wear.

In cages which are discontinuous or segmented, connector means on each segment are necessary for joining adjacent cage segments. One type of clutch cage system having various segments is described in U.S. Pat. No. 4,054,192, issued to Johnson which comprises a number of plastic segments which fit together in the races. However, the linking or connector means on each segment puts additional stresses on the each segment. Further, while it is desired to hold the cages centered between the races, the individual segments tend to undesirably move or dislodge in the radial, axial and/or circumferential directions.

The present invention eliminates the problems particular to the above described prior art and provides segmented cages that are not connected to an adjoining segment.

It is, therefore, an object of the present invention to provide an improved clutch wherein a plurality of segmented cages are retained within the clutch in three directions: axially, radially and circumferentially.

It is another object of the present invention to provide an improved method for installing segmented cages into a clutch by providing at least one engaging means or latching mechanism on the segmented cage so that the segmented cage is held in retention in the axial, radial and circumferential directions.

DISCLOSURE OF THE INVENTION

The present invention provides an improved roller clutch having a camming race and pathway race. A plurality of individual segments forming a cage are installed between the races. The cage segments maintain a fixed distance between the races relative to the axis of the races. A plurality of rollers and resilient means (such as a spring) are disposed between the races. The rollers between the races move in a circumferential direction between the races during clutch operation.

The camming race defines a plurality of cam surfaces which are circumferentially disposed along one surface of the cam race. Individual cage segments are disposed adjacent each cam surface of the cam race. The cage segments are not connected to each other. Rather, each cage segment is independently attached to the cam race. Each cage segment has a camming surface which contacts the adjacent cam surface of cam race during clutch operation.

A roller and energizing spring, which may comprise, for example, a pleated, accordion-type of spring or a wire spring, are positioned within an interior space defined by the cage segment. The segments each including a roller and spring, are placed adjacent the cammed surface in the cam race. Each cage segment has a means which engages an outer side of the cam race. In preferred embodiments, the engaging means comprises at least one tab or latching mechanism that snaps or secures the cage segment onto the outer surface of the cam race. The individual snapping cage segments are securely retained in the radial, axial and circumferential directions on the cam race. In preferred embodiments, the segment is moved or snapped into at least one retaining means on the outer surface of the cam race.

The cage segment of the present invention generally has two side walls in opposed parallel relationship and two end walls in opposed parallel relationship. One feature of the invention is that portions of the side walls form the engaging means or latching mechanism for engaging the cam race. Another feature is that the roller and spring are securely retained within the annular space between the races. The rollers ride or travel circumferentially along the smooth inner surface of the pathway race. When the direction of the cam race or the pathway race is changed the segments are wedged between the inner surface of the pathway race and the cam surface of the cam race. One feature of the invention is that, during this change in direction or relative rotation of the cam race with respect to the pathway race, the roller is held in a secure circumferential, radial and axial position such that substantially the entire longitudinal surface of the roller engages the inner surface of the pathway race and the camming race. That is, the roller is prevented from skewing such that a smooth transition or shift occurs. Upon movement in the opposite direction, the cam race freely and smoothly overruns or moves relative to the pathway race.

Another feature of the present invention is that the side walls and the end walls of the snapping segment aid in retaining lubrication in the areas where such lubrication is most needed. The cage segments create a barrier to funnel lubrication out of the cam race and toward the friction pack of the clutch.

Still another feature is that the individual cage segments of the present invention reduce the cost of producing roller clutches since there is no need to assemble cage segments into a linked cage.

BRIEF DESCRIPTION OF THE DRAWINGS

FIG. 3 is a fragmentary view of a clutch assembly showing portions of the cage in phantom to illustrate internal detail.

FIG. 4 is a view taken substantially along the line 4—4 in FIG. 3.

BEST MODE OF CARRYING OUT THE INVENTION

Figure 1:
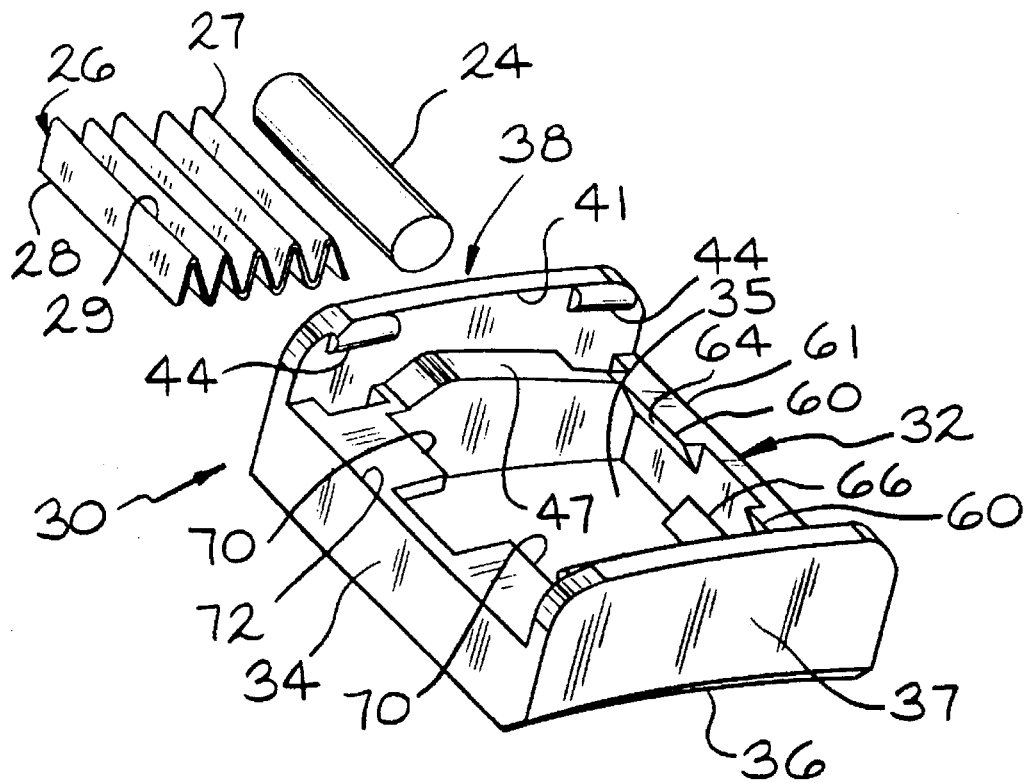
FIG. 1 is a perspective view of a segmented cage showing one end of the cage in detail.

Referring first to FIGS. 3 and 4, a clutch 8 and a pair of races including an outer cam race 10 and an inner smooth cylindrical pathway race 12 are shown. For ease of illustration the outer race is shown as the cam race and the inner race is shown as the pathway race. However, it should be understood that either the outer race or the inner race can define the camming surface or the pathway surface.

A plurality of cage segments generally shown as 30 are positioned between the races 10 and 12. In preferred embodiments the cage segments 30 are molded of a suitable plastic or metal material which has desirable strength and frictional characteristics. The cage segments of the present invention are easier to mold into a suitable shape and provide more cost benefits both in production and in shipping than that of currently available cages. As shown, the cage segments 30 are slightly arcuate in elevation such that each cage segment 30 fits within the arcs defined by the cam and pathway races 10 and 12, respectively. Each cage segment 30 is in a spaced apart relationship from a neighboring cage segment. There is no contact between neighboring cage segments. Therefore, stresses created in one cage segment will not affect another cage segment. Since each segment moves separately within the clutch, there is no longer a need to use the prior art thin cages which required thin sections in order to give the cage the desired flexibility. Rather, according to the present invention, the individual segments can be formed having optimum dimensions of thickness, width and length without concern for flexibility of the series of cage segments.

A cammed surface 18 on the cam race 10 and a substantially smooth circumferentially extending inner surface 13 on the pathway race 12 define an annular space 22. The cam race 10 has at least one retaining means 14 on one side surface 15 and at least one retaining means 16 on another side surface 17 of the race 10. In the embodiment shown the retaining means 14 and 15 comprise circumferentially extending detents or grooves. However, it is to be understood that other retaining means for receiving and securing the cage segment to the cam race are within the contemplated scope of the present invention, and that for ease of illustration of the present invention only the retaining means generally depicted as circumferentially extending detents or grooves are shown. It is further to be understood that the retaining means can comprise grooves or detents which only partially extend circumferentially around the cam race such that the detents have a discontinuous arcuate shape. Also contemplated are retaining means which protrude from the cam race and secure the cage segment onto the cam race by contacting at least one engaging means on the segment which has an indented groove or detent shape. The retaining means 14 and 16 are in a spaced apart relationship to the cammed surface 18 of the cam race 10. The cammed surface 18 of the cam race 10 is machined to define a plurality of evenly spaced sloped cam ramps 20. The annular space 22 receives the segment 30 which has at least one roller 24 and at least one resilient means 26 such as a spring positioned within the segment. The roller 24 is biased in one direction by the spring 26.

During operation of the clutch both the cam race 10 and pathway race 12 rotate in the same direction. The spring 26 holds the roller 24 in an operating position such that the roller 24 contacts the inner surface 13 of the pathway race 12. During the operation of the clutch the roller 24 moves or rotates in a direction toward the spring 26. The spring 26 is compressed by the roller 24. The cam race 10 and pathway race 12, while rotating in the same direction do not always maintain equidistance axial positions. Rather, the annular space 22 between the cammed surface 18 of the cam race 10 and the inner surface 13 of the pathway race 12 varies in distance with each rotation of the races 10 and 12.

Figure 2:
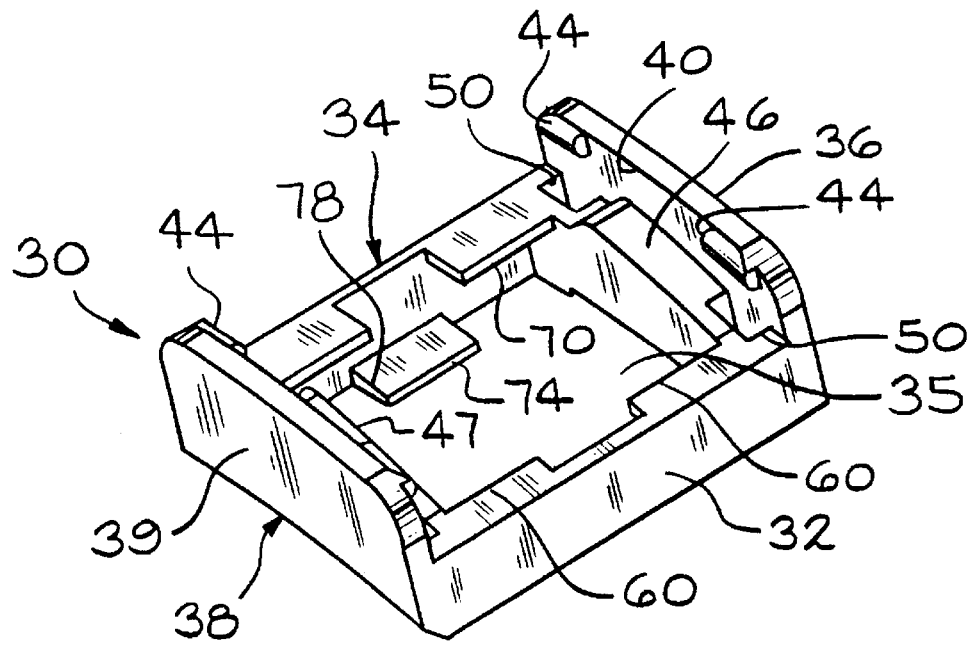
FIG. 2 is a perspective view of a segmented cage showing the other end in detail.

Referring now to FIGS. 1 and 2 the cage segment 30 of the present invention is generally shown. The segment 30 comprises a first end 32 and a second end 34 which are in spaced apart parallel relationship and a first side wall 36 and a second side wall 38 which are in spaced apart parallel relationship. The ends 32 and 34 and side walls 36 and 38 define an interior space 35 which, in preferred embodiments, is substantially rectangular or square in shape. Each side wall 36 and 38 has an outer wall surface 37 and 39, respectively, as shown in FIGS. 1 and 2. Each side wall 36 and 38 also has an inner wall surface 40 and 41, respectively.

Each inner surface 40 and 41 of the side walls 36 and 38 has at least one engaging means 44 which extends from the inner surface of one side wall toward the opposite inner surface of the other side wall. It is to be understood that various engaging means are useful in the present invention. In the embodiment shown the engaging means 44 comprises at least one, and preferably two, tabs or latching members or mechanisms as shown best in FIGS. 1 and 2. Thus, the engaging means 44 on the inner surface 40 of the side wall 36 extends in a direction toward the inner surface 41 of the side wall 38. The engaging means 44 on the inner surface 41 of the side wall 38 extends in a direction toward the inner surface 40 of the side wall 36. In various embodiments at least one opening 50, which is formed so that the engaging means 44 can be easily molded, extends longitudinally along the inner surfaces 40 and 41 of the side walls 36 and 38.

Each inner surface 40 and 41 of each side wall 36 and 38 further define a reaction ear or camming surface 46 and 47, respectively. In operation the camming surfaces 46 and 47 slideably or matingly engage the sloped cam ramp 20 of the cam race 10. In addition the inner surfaces 40 and 41 of each side wall 36 and 38 hold the roller 24 in position such that any propensity of roller skew during operation of the clutch is diminished.

In the embodiment shown the first end 32 of the segment 30 defines one or more upper flanges 60 which extend inwardly in a direction toward the second end 34. In the embodiment shown, the first end 32 comprises flanges 60A and 60B which extend from a top portion 61 of the first end 32. The flanges 60A and 60B can have a wedge or sloped surface 64. In the embodiment shown, the first end 32 defines at least one lower flange 66 which also extends inwardly in a direction toward the second end 34 from a lower portion 68 of the first end 32. The flange 66 can have a wedge or sloped surface. The flanges 60A and 60B and the flange 66 engage the roller 24. The roller 24 is held between the upper flanges 60A and 60B and the lower flange 66 by the spring 26. The roller 24 is engaged between the flanges 60 and 66 prior to installation of the segment 30 in the clutch. However, it is to be understood that the cage segment of the present invention can be formed without the upper and lower flanges 60 and 66 and the spring 26 can hold the roller 24 within the cage segment 30.

The second end 34 of the segment 30 defines at least one or more upper flanges 70 which extend in a direction toward the first end 32. In the embodiment shown, the second end 34 comprises flanges 70A and 70B which are in a spaced apart relationship and which extend from a top portion 71 of the second end 34. The second end 34 further defines at least one lower flange 74 which extends inwardly in a direction toward the first end 32 from a lower portion 76 of the second end 34. The flanges 70A and 70B and the flange 74 engage or hold the spring 26 within the cage 30. In the embodiment shown the flange 74 can have a sloped upper surface 78. The sloped surface 78 of the flange 74 acts to bias at least one edge 29 of the spring 26 in a direction toward the upper flanges 70A and 70B. The spring 26 is held in position in the segment 30 by having its first end 27 engage the roller 24 and its second end 28 engage the flanges 70 and flange 74.

Assembly of the clutch comprises placing the roller 24 and the spring 26 within the interior space 35 of the segment 30. In certain embodiments where flanges 60 and 66 are present, the roller 24 is positioned against the flanges 60A and 60B and flange 66. The spring 26 is compressibly positioned against the flanges 70A and 70B and flange 74 and against the longitudinal surface of the roller 24. Thereafter, the assembled segment 30, having the spring 24 and the roller 26 positioned therein, is snapped into position in the cam race 12 by aligning the camming surfaces 46 and 47 of the segment 30 with an adjacent sloped cam ramp 20 of the cam race 10. The segment 30 is moved in a radially outward direction toward the cam race 10 such that the engaging means 44 contacts the sides 15 and 17 of the cam race 10. The side walls 36 and 38 of the cage segment 30 flex outwardly as the engaging means 44 is slideably moved along the outer sides 15 and 17 of the cam race 10 until the engaging means 44 are in contact with (or snapped into) the retaining means 14 and 16, on the sides 15 and 17, respectively, as best seen in FIG. 4. When the segment 30 is snapped onto the cam race 10 the roller 24 moves in a direction toward the spring 26 such that the spring 26 is compressed.

The segment 30 is held in radial retention due to the engagement of the cam race 10 by the engaging means 44. That is, the engaging means 44 hold the segment 30 in snug relationship against the retaining means 14 and 16 so that there is no radial movement of the segment 30 as the annular space 22 varies in width.

The segment 30 is held in circumferential retention is due to the contact between the camming surfaces 46 and 47 of the segment 30 against the sloped cam ramp 20 of the cam race 10.

The segment 30 is held in axial retention due to the engagement of the engaging means 44 with the retaining means 14 and 16. The side walls 34 and 36 of the segment 30 hold the spring 26 and steel roller 24 in axial retention.

After the cage segments 30 are secured to the cam race 10, the pathway race 12 is installed adjacent the cage segments 30 to form the clutch 8.

It is to be understood that variations in the preferred embodiments can be made without departing from the intended scope of the present invention, For example, the shape configuration and the number of the engaging means on the cage segment can be altered.

I claim:

1. A roller clutch having a plurality of rollers located between a cam race and a pathway race, the cam and pathway races being substantially coaxial about a single axis extending in an axial direction and defining an annular space, the cam race defining a plurality of sloped cam ramp surfaces and the pathway race defining a cylindrical path in opposed relationship to the cam ramp surface, each of the rollers being engaged between the cylindrical path on the pathway race and an adjacent cam ramp surface on the cam race, the rollers moving in a circumferential direction in the annular space between the races during clutch operation, each of the rollers being held in position by a cage segment in the annular space between the races, each cage segment being in a spaced apart relationship to an adjacent cage segment, each cage segment having substantially parallel opposed side walls and substantially parallel opposed end walls, the cage segment defining an interior space wherein the roller is circumferentially moved along the annular space between the races, the cage segment having at least one camming surface for slideably engaging the cam ramp surface, the cage segment having at least one engaging means for securing the cage segment to the cam race within the annular space between the races, wherein the segment is secured to the cam race in radial, axial and circumferential directions.

2. The roller clutch of claim 1, wherein the cam race provides a retaining means for receiving the engaging means.

3. The clutch of claim 2, wherein the retaining means of the cam race comprises least one detent on a first side surface of the cam race and at least one detent on an opposing, second side surface of the cam race, the detents being in a spaced apart relationship to the cammed ramp surface of the cam race, wherein the engaging means of the cage segment is secured within the first and second detents.

4. The roller clutch of claim 1, wherein each cage segment has at least one engaging means on each side wall for securing the cage segment to the cam race.

5. The roller clutch of claim 1, wherein the first and second side walls and the first and second ends of the cage segment retain lubrication in the interior space defined by the side walls and the end walls.

6. A unitary cage segment comprising a first end and a second end which are in a spaced apart parallel relationship and a first side wall and a second side wall which are in a spaced apart parallel relationship, each side wall having an interior surface which defines a camming surface for matingly engaging a sloped cam ramp surface on a cam race in a clutch, the first and second ends and first and second side walls defining an interior space for receiving at least one roller means and at least one resilient means, each side wall defining at least one engaging means for securing the cage segment to the cam race in radial, axial and circumferential directions, wherein the cage segment is in a spaced apart and unconnected relationship from an adjacent cage segment.

7. The cage segment of claim 4, wherein the engaging means comprises at least one latching member which extends inwardly from one side wall to the opposing side wall.

8. The cage segment of claim 6, wherein the second end defines at least one upper flange which extends in a direction toward the first end, the second end further defining at least one lower flange which extends in a direction toward the first end of the second end, wherein the upper flange and lower flange engage the resilient means.

9. The cage segment of claim 6, wherein the first end defines at least one upper flange which extend in a direction toward the second end, the first end further defining at least one lower flange which extends in a direction toward the second end, wherein the upper flange and lower flange engage the roller.

10. The cage segment of claim 8, wherein the lower flange on the second end has a sloped surface for biasing one edge of the resilient means in a direction toward the upper flange on the second end.

11. The cage segment of claim 9, wherein at least one of the upper flange and lower flange on the first end have sloped or wedged surfaces which matingly engage the longitudinal surface of the roller.

12. A method for installing a cage in the radial, axial and circumferential directions in a clutch having a pathway race and a cam race, the cam race defining a cam ramp surface, comprising the steps of:

providing a plurality of unconnected cage segments, each segment having opposing side walls and opposing end walls for retaining at least one roller and at least one resilient means therein, each of the side walls defining a camming surface and at least one engaging means;

centering the camming surface of each cage segment adjacent a corresponding cam ramp surface of the cam race;

moving the cage segment in at least a radial direction toward the cam race until the engaging means on the cage segment secures the cage segment on the cam race.

13. The method of claim 12, in which the cam race is provided with at least one retaining means for receiving the engaging means.

14. The cage segment of claim 6, each side wall has at least one engaging means for securing the cage segment to the cam race.

15. The unitary cage segment of claim 1, wherein the first and second ends and the first and second side walls retain lubrication in the interior space defined by the side walls and the end walls.

\* \* \* \* \*